(12) United States Patent
Terai et al.

(10) Patent No.: US 9,975,397 B2
(45) Date of Patent: May 22, 2018

(54) AIR-CONDITIONING REGISTER

(71) Applicant: TOYODA GOSEI CO., LTD., Kiyosu-shi, Aichi-ken (JP)

(72) Inventors: Nobuhiro Terai, Kiyosu (JP); Hiroshi Sakai, Hamamatsu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 529 days.

(21) Appl. No.: 14/641,955

(22) Filed: Mar. 9, 2015

(65) Prior Publication Data

US 2015/0360536 A1 Dec. 17, 2015

(30) Foreign Application Priority Data

Jun. 17, 2014 (JP) ................. 2014-124333

(51) Int. Cl.
*B60H 1/24* (2006.01)
*B60H 1/00* (2006.01)

(52) U.S. Cl.
CPC ..... *B60H 1/00678* (2013.01); *B60H 1/00671* (2013.01); *B60H 2001/00714* (2013.01)

(58) Field of Classification Search
CPC .................. B60H 1/00678; B60H 2001/00714
USPC ........................................ 454/333, 108, 109
See application file for complete search history.

(56) References Cited

U.S. PATENT DOCUMENTS

| | | | | |
|---|---|---|---|---|
| 2,836,113 A | * | 5/1958 | Seyfarth ............ | B60H 1/00021 454/148 |
| 3,724,812 A | * | 4/1973 | Richardson ....... | B29C 45/14311 251/306 |
| 4,402,486 A | * | 9/1983 | Jacquet .............. | B60H 1/00678 251/306 |
| 4,892,288 A | * | 1/1990 | Norbury, Jr. ......... | B60H 1/3435 251/306 |
| 5,679,073 A | * | 10/1997 | Hsieh ................. | B60H 1/00678 137/625.31 |
| 6,872,348 B2 | * | 3/2005 | Yasuno ............. | B29C 45/14336 264/259 |

(Continued)

FOREIGN PATENT DOCUMENTS

| | | | |
|---|---|---|---|
| DE | 10029097 A1 * | 12/2001 | ......... B60H 1/00678 |
| JP | 4-123709 U | 11/1992 | |

(Continued)

OTHER PUBLICATIONS

Office Action dated May 30, 2017 issued in corresponding JP application No. 2014-124333 (and English translation).

*Primary Examiner* — Steven B McAllister
*Assistant Examiner* — Frances F Hamilton
(74) *Attorney, Agent, or Firm* — Posz Law Group, PLC

(57) ABSTRACT

A shut-off damper of an air-conditioning register has a damper body serving as a frame portion and a sealing portion softer than the damper body. The sealing portion includes a distal sealing portion caused to contact an inner wall surface of a retainer at a closed position and a flexible joint portion joining the distal sealing portion and the damper body together. The distal sealing portion has a cross section configured by a projected curved portion and contacts the inner wall surface of the retainer at the curved portion. At least a part of the joint portion has an increased thickness portion having a thickness increasing toward the damper body.

4 Claims, 9 Drawing Sheets

(56) References Cited

U.S. PATENT DOCUMENTS

| | | | | |
|---|---|---|---|---|
| 7,520,803 | B2 * | 4/2009 | Ito | B60H 1/00678 |
| | | | | 251/314 |
| 8,043,148 | B2 * | 10/2011 | Eguchi | B60H 1/00671 |
| | | | | 454/262 |
| 9,555,692 | B2 * | 1/2017 | Shibata | B60H 1/3421 |
| 9,657,956 | B2 * | 5/2017 | Nolta, Jr. | F24F 7/00 |
| 2003/0054751 | A1 * | 3/2003 | Parekh | B60H 1/00678 |
| | | | | 454/121 |
| 2006/0252362 | A1 * | 11/2006 | Ito | B60H 1/00678 |
| | | | | 454/156 |
| 2008/0146139 | A1 * | 6/2008 | Terai | B60H 1/3421 |
| | | | | 454/155 |
| 2010/0224253 | A1 * | 9/2010 | Azar | B60H 1/00678 |
| | | | | 137/1 |
| 2014/0004784 | A1 * | 1/2014 | Nolta, Jr. | F24F 7/00 |
| | | | | 454/195 |

FOREIGN PATENT DOCUMENTS

| | | | | |
|---|---|---|---|---|
| JP | 2575479 | Y2 * | 6/1998 | ............ B60H 1/34 |
| JP | 2004-074945 | A | 3/2004 | |
| JP | 2008-100593 | A | 5/2008 | |
| JP | 2008-105562 | A | 5/2008 | |
| JP | 2008100593 | A * | 5/2008 | |
| JP | 2011-158222 | A | 8/2011 | |
| JP | 2012-214177 | A | 11/2012 | |

\* cited by examiner

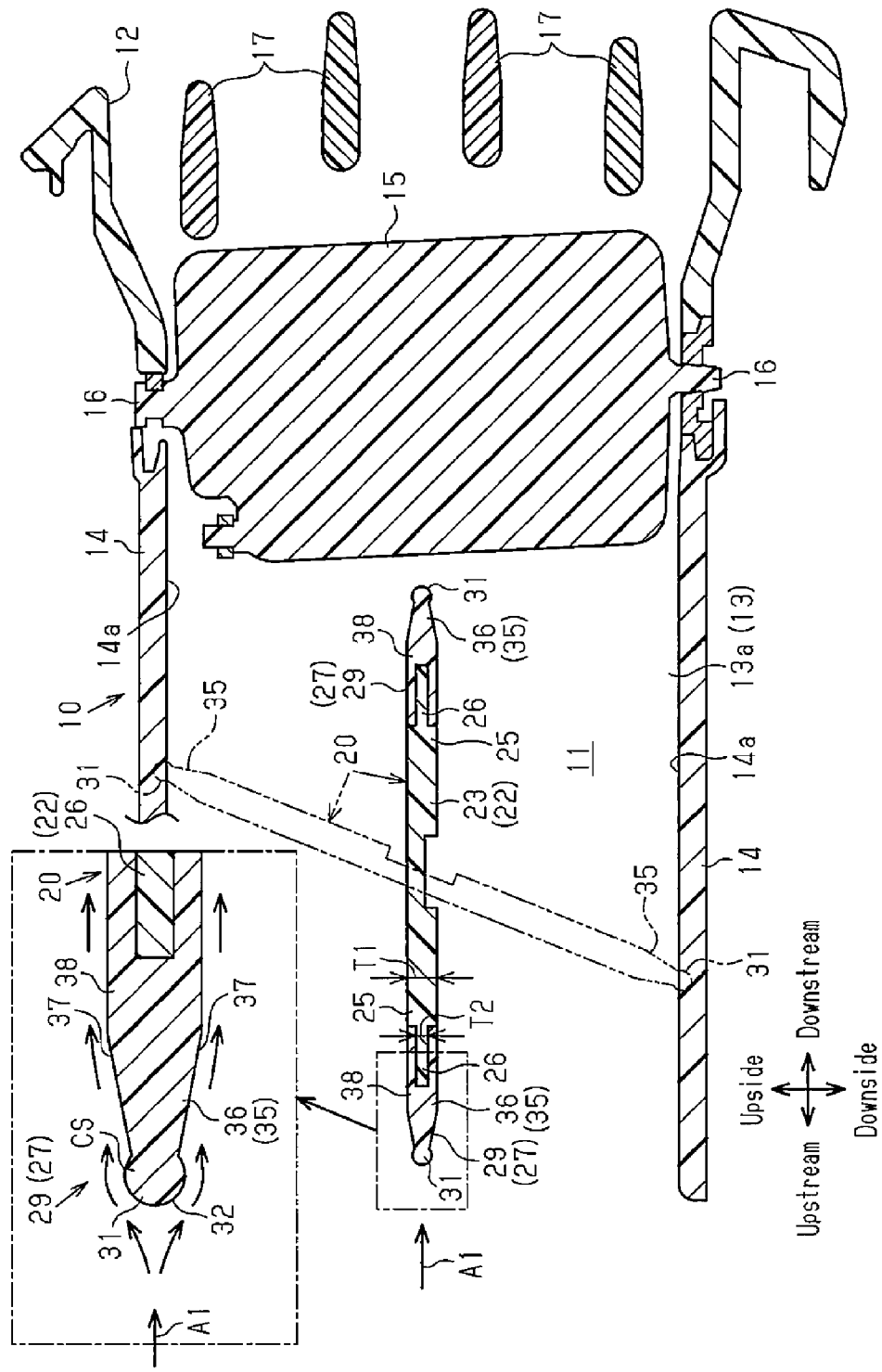

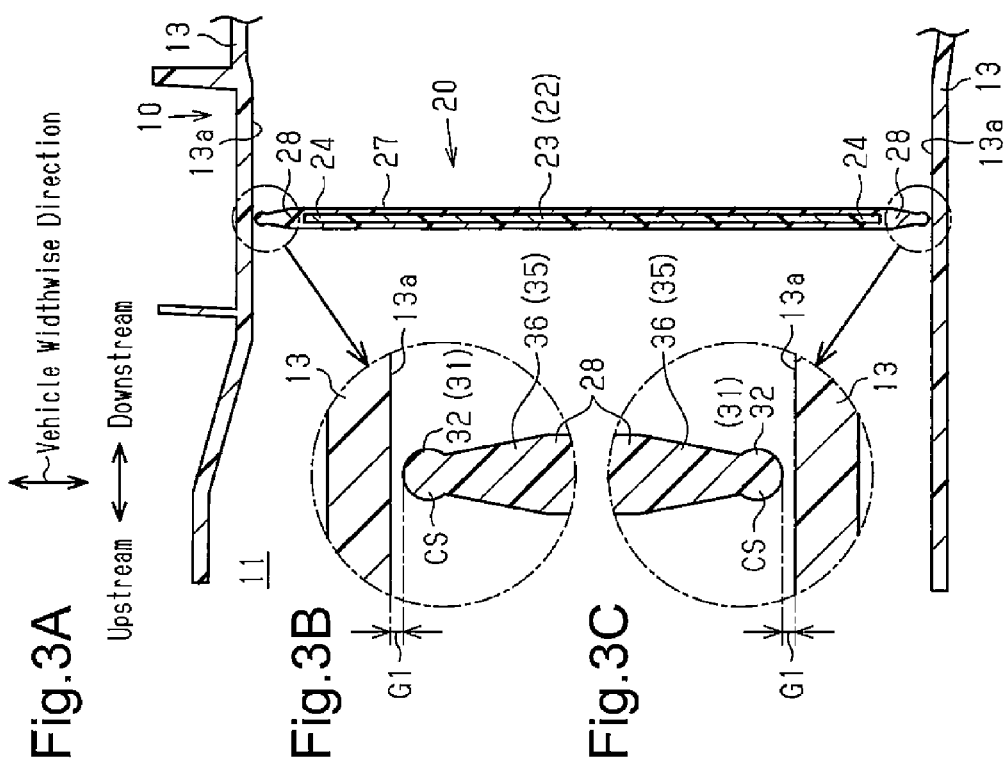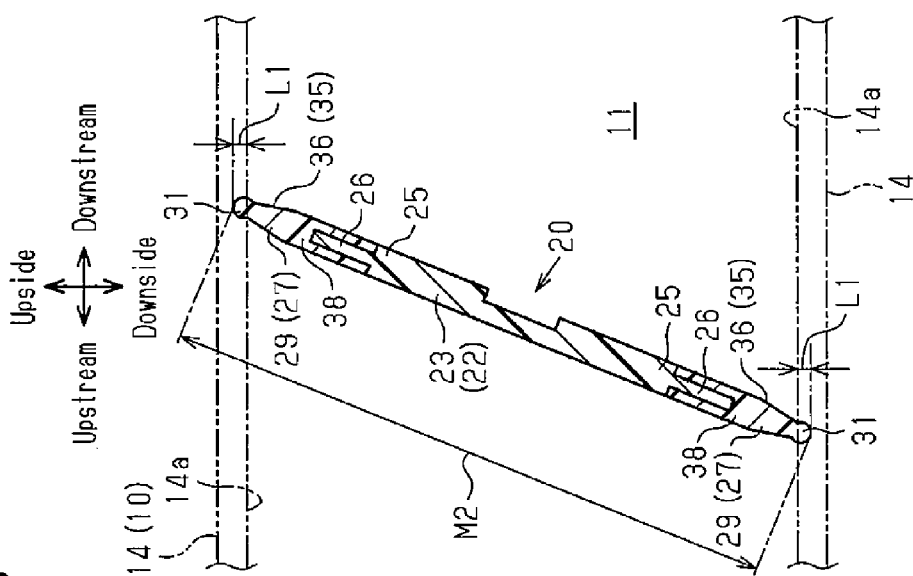

Fig.6
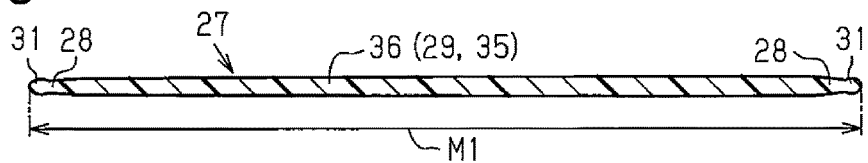
Fig.7A Fig.7B
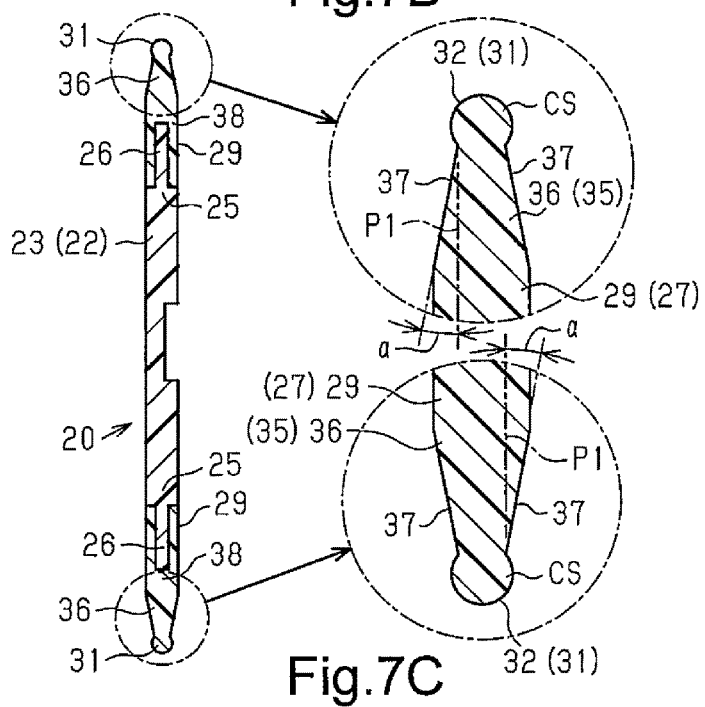
Fig.7C
Fig.8
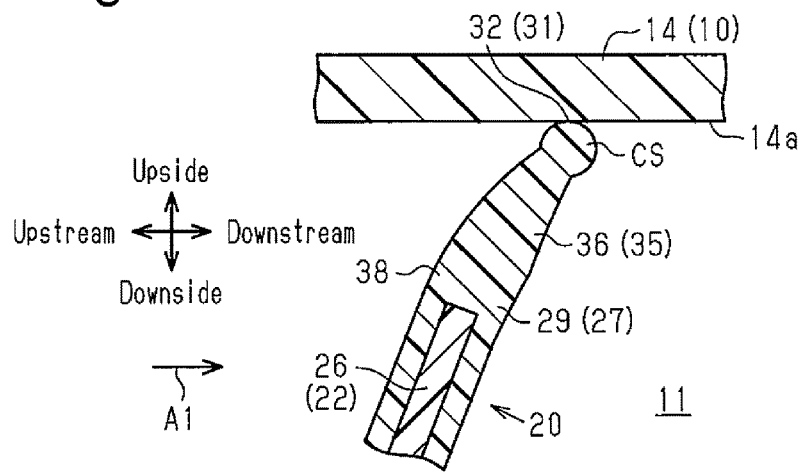

Fig.11
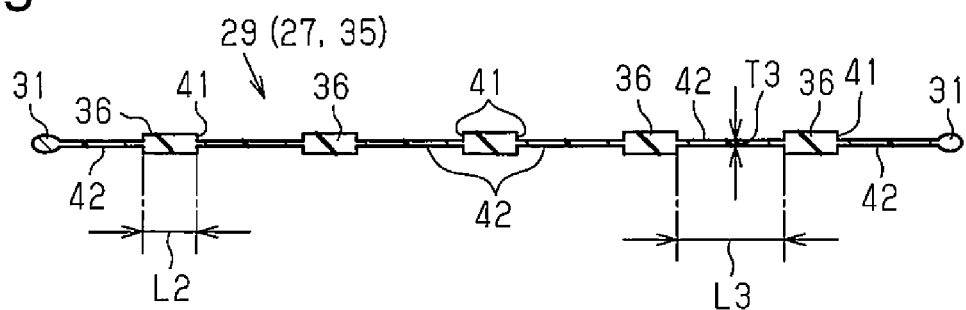
Fig.12A
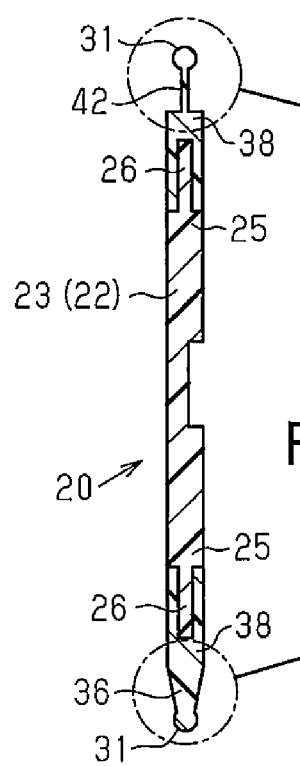
Fig.12B
Fig.12C
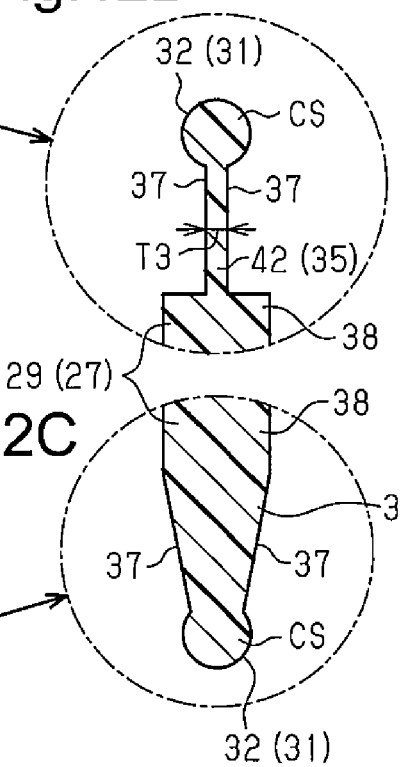

AIR-CONDITIONING REGISTER

BACKGROUND OF THE INVENTION

The present invention relates to an air-conditioning register having a shut-off damper for selectively opening and closing an air passage for air-conditioning air.

An air-conditioning register, which delivers air-conditioning air supplied from an air conditioner through an outlet port of an air passage, is incorporated in an instrument panel of a vehicle. By pivoting fins arranged upstream of the outlet port of the air passage in the air-conditioning register, the direction in which the air-conditioning air is delivered through the outlet port is adjusted. A shut-off damper is arranged upstream of the fins in the air passage. The shut-off damper is pivoted about the axis between an open position for opening the air passage and a closed position for closing the air passage.

Shut-off dampers employed in air-conditioning registers include, for example, the shut-off damper described below.

As shown in FIG. 16, a shut-off damper described in Japanese Laid-Open Patent Publication No. 2012-214177 is configured by two components, which are a damper body 51 and a sealing member 53. The damper body 51 is formed in a plate-like shape using hard material. Two clamping pieces 52, which are spaced apart in the direction of the thickness of the damper body 51, are formed in an outer peripheral portion of the damper body 51. The sealing member 53 is formed in an annular shape using soft material such as urethane. The sealing member 53 is clamped by the two clamping pieces 52 of the damper body 51 and thus attached to the outer peripheral portion of the damper body 51. When at the closed position represented by the long dashed double-short dashed lines in FIG. 16, the sealing member 53 is held in contact with an inner wall surface 54a of a retainer 54 to block the flow of air-conditioning air A1. The sealing member 53 of this type of shut-off damper 50 flexes when the shut-off damper 50 is pivoted to the closed position. That is, the sealing member 53 is brought into contact with the inner wall surface 54a of the retainer 54 in a larger area. This reduces the air-conditioning air A1 leaking from between the inner wall surface 54a and the shut-off damper 50.

However, since the shut-off damper 50 is configured by the two components, which are the damper body 51 and the sealing member 53, the costs for the components of the sealing member 53 and the number of assembly steps are increased. This increases the costs for manufacturing the shut-off damper 50.

The sealing member 53 is clamped by the two clamping pieces 52 and thus attached to the damper body 51. This increases the thickness of the shut-off damper 50 by the amount corresponding to the thicknesses of the clamping pieces 52. The increased thickness of the shut-off damper 50 decreases the actual opening area of the outlet port when the shut-off damper 50 is pivoted to the open position represented by the solid lines in FIG. 16. The actual opening area is the area of the portion that does not include projection of the various components (including the shut-off damper 50) arranged in the retainer 54 in an imaginary plane extending perpendicular to the flow direction of the air-conditioning air A1 through the outlet port. As the actual opening area decreases, the resistance to airflow increases. This increases pressure loss and generates noise.

Also, the air-conditioning air A1 becomes separated from a corner portion of the sealing member 53, thus hampering the flow of the air-conditioning air A1. The pressure loss is thus increased.

In contrast, with reference to FIG. 17, a shut-off damper described in Japanese Laid-Open Patent Publication No. 2004-74945 includes a damper body 61 serving as a frame portion and a sealing portion 62, which is softer than the damper body 61. The sealing portion 62 is formed integrally with the damper body 61 to extend at least along an outer peripheral portion of the damper body 61. The sealing portion 62 includes a distal sealing portion 63 and a flexible joint portion 64 for joining the distal sealing portion 63 and the damper body 61 together. The distal sealing portion 63 has a circular cross section and the joint portion 64 has a rectangular cross section. When at the closed position represented by the long dashed double-short dashed lines in FIG. 17, the distal sealing portion 63 is held in contact with an inner wall surface 65a of a retainer 65.

In this type of shut-off damper 60, since the sealing portion 62 is formed integrally with the damper body 61, it is unnecessary to join the sealing member 53 to the shut-off damper 50 illustrated in FIG. 16. This reduces the costs for manufacturing the shut-off damper 60.

As illustrated in FIG. 18, when at the closed position, the joint portion 64 is elastically deformed and the distal sealing portion 63, which has the circular cross section, is pressed against the inner wall surface 65a by elastic restoring force produced by the joint portion 64. This restrains leakage of the air-conditioning air A1 from between the inner wall surface 65a and the shut-off damper 60.

Also, since the shut-off damper 60 does not need to include the two clamping pieces 52 illustrated in FIG. 16, the thickness of the shut-off damper 60 is relatively small. This restrains decrease in the actual opening area of the outlet port caused by the sealing portion 62 when the shut-off damper 60 is at the open position represented by the solid lines in FIG. 17. Correspondingly, the resistance to airflow and the pressure loss are decreased and generation of the noise is restrained.

Such decrease in the resistance to airflow and pressure loss is brought about also by the fact that the cross section of the distal sealing portion 63 has the circular shape and the distal sealing portion 63 thus lacks a corner portion.

The shut-off damper 60 described in Japanese Laid-Open Patent Publication No. 2004-74945, however, includes the thin plate-like joint portion 64, which is formed at a position downstream of the distal sealing portion 63 as illustrated in FIG. 19. There are zones R1 generating turbulence on the opposite sides in the direction of the thickness of the joint portion 64. Therefore, after the air-conditioning air A1 passes the distal sealing portion 63 while flowing along the shut-off damper 60 located at the open position, turbulence may occur in the zones R1 and thus cause pressure loss.

SUMMARY OF INVENTION

Accordingly, it is an objective of the present invention to provide an air-conditioning register capable of further reducing pressure loss when a shut-off damper is at an open position.

To achieve the foregoing objective and in accordance with one aspect of the present invention, an air-conditioning register is provided that includes a tubular retainer having an air passage for air-conditioning air and a shut-off damper arranged in the retainer. The shut-off damper has a damper body serving as a frame portion and a sealing portion softer than the damper body, wherein the shut-off damper is pivoted between an open position for opening the air passage and a closed position for closing the air passage. The sealing portion includes a distal sealing portion caused to contact an inner wall surface of the retainer at the closed position and a flexible joint portion joining the distal sealing portion and the damper body together. The distal sealing portion has a cross section configured by a projected curved portion and contacts the inner wall surface of the retainer at the curved portion. At least a part in a longitudinal direction of the joint portion has an increased thickness portion having a thickness increasing toward the damper body.

In the above-described configuration, when the shut-off damper is at the closed position, the joint portion is flexed and the distal sealing portion contacts the inner wall surface of the retainer at the projected curved portion. The elastic restoring force produced by the joint portion presses the distal sealing portion against the inner wall surface of the retainer. The thickness of the increased thickness portion increases toward the damper body, thus improving rigidity of the increased thickness portion. This increases the elastic restoring force produced by the increased thickness portion. The distal sealing portion is thus firmly pressed against the inner wall surface of the retainer. Also, the distal sealing portion, which is firmly pressed, is elastically deformed to a great extent. The distal sealing portion thus contacts the inner wall surface of the retainer in a larger area. As a result, tight contact performance of the sealing portion of the shut-off damper with respect to the inner wall surface of the retainer is improved.

In contrast, when the shut-off damper is at the open position and the air-conditioning air flows in the air passage, the air-conditioning air proceeds along the shut-off damper. The air-conditioning air flows along the distal sealing portion first in the sealing portion. The distal sealing portion has the cross section configured by the projected curved portion. The air-conditioning air gradually changes its flow direction by flowing along the curved portion. The air-conditioning air flows along the joint portion after having passed the distal sealing portion. The part of the joint portion configured by the increased thickness portion has a thickness increasing toward the damper body. This makes it unlikely that zones generating turbulence in the air-conditioning air will be generated on opposite sides of the joint portion in the thickness direction of the joint portion. As a result, the air-conditioning air is allowed to flow downstream efficiently while restraining turbulence by proceeding along the increased thickness portion. This decreases the resistance to the air-conditioning air and reduces the pressure loss of the air-conditioning air when flowing along the joint portion.

BRIEF DESCRIPTION OF THE DRAWINGS

FIG. 1A is a cross-sectional side view of an air-conditioning register for a vehicle according to a first embodiment, illustrating the internal configuration of the air-conditioning register with a shut-off damper pivoted to an open position;

FIG. 1B is an enlarged cross-sectional side view showing a part of FIG. 1A;

FIG. 2 is a cross-sectional side view showing a portion with the shut-off damper shown in FIG. 1A pivoted to a closed position;

FIG. 3A is a cross-sectional plan view showing a part of the air-conditioning register shown in FIG. 1A;

FIG. 3B is an enlarged cross-sectional plan view showing a part of FIG. 3A;

FIG. 3C is an enlarged cross-sectional plan view showing another part of FIG. 3A different from the portion shown in FIG. 3B;

FIG. 6 is a cross-sectional view taken along line 6-6 of FIG. 5;

FIG. 7A is a cross-sectional view taken along line 7A-7A of FIG. 5;

FIG. 7B is an enlarged cross-sectional view showing a part of FIG. 7A;

FIG. 7C is an enlarged cross-sectional view showing another part of FIG. 7A different from the portion shown in FIG. 7B;

FIG. 8 is a cross-sectional side view showing a part of the air-conditioning register shown in FIG. 1A in a state in which an elastically deformed increased thickness portion presses a distal sealing portion against an inner wall surface of a lateral wall portion;

FIG. 11 is a cross-sectional view taken along line 11-11 of FIG. 10;

FIG. 12A is a cross-sectional view taken along line 12A-12A of FIG. 10;

FIG. 12B is an enlarged cross-sectional view showing a part of FIG. 12A;

FIG. 12C is an enlarged cross-sectional view showing another part of FIG. 12A different from the portion shown in FIG. 12B;

DETAILED DESCRIPTION OF THE PREFERRED EMBODIMENTS

First Embodiment

Figure 4:
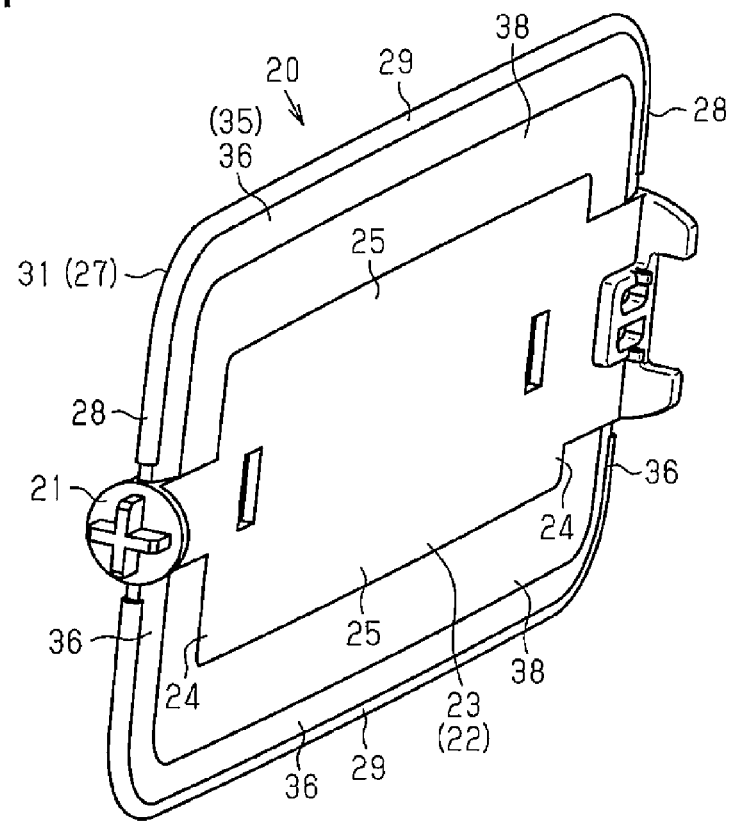
FIG. 4 is a perspective view showing the shut-off damper shown in FIG. 1A.

An air-conditioning register for a vehicle according to a first embodiment will now be described with reference to FIGS. 1A to 8.

In the following, the direction in which the vehicle advances forward will be referred to as the front, the reverse direction will be referred to as the rear, the direction of the height will be referred to as a vertical direction.

In a passenger compartment, an instrument panel is arranged forward of the front seats (the driver's seat and a front passenger seat) of the vehicle. Air-conditioning registers are incorporated in a middle part of the instrument panel in the vehicle widthwise direction and opposite side portions of the instrument panel.

As shown in FIG. 1A, each of the air-conditioning registers includes a retainer 10 and a plurality of fins as basic components. The configuration of each of the components will hereafter be described.

<Retainer 10>

The retainer 10 is configured by a plurality of components each formed of hard plastic material and has a tubular shape having opposite open ends. The internal space of the retainer 10 configures a passage (hereinafter, referred to as an "air passage 11") for air-conditioning air A1 supplied from an air conditioner (not shown). Regarding the flow direction of the air-conditioning air A1 in the air passage 11, the side close to the air conditioner is the upstream side and the side spaced from the air conditioner is the downstream side. The downstream end of the air passage 11 configures an outlet port 12 for the air-conditioning air A1. The outlet port 12 has a laterally elongated rectangular shape having a dimension in the vehicle widthwise direction (the direction perpendicular to the sheet surface of FIG. 1A) that is greater than the dimension in the vertical direction.

The air passage 11 is surrounded by four wall portions of the retainer 10. The four wall portions are a pair of vertical wall portions 13 (see FIG. 3), which oppose each other in the vehicle widthwise direction, and a pair of lateral wall portions 14, which oppose each other in the vertical direction. Inner wall surfaces 13a of the vertical wall portions 13 and inner wall surfaces 14a of the lateral wall portions 14 are each formed by a flat surface.

<Fins>

The fins include a plurality of downstream fins 17 and a plurality of upstream fins 15. The downstream fins 17 are arranged in an upstream vicinity of the outlet port 12 of the air passage 11 and spaced apart in the vertical direction. Support shafts (not shown) are projected from the opposite end surfaces of each of the downstream fins 17 in the vehicle widthwise direction and faced outward in the vehicle widthwise direction. Each downstream fin 17 is supported by the two vertical wall portions 13 with the two support shafts. This allows the downstream fin 17 to pivot about the support shafts in the vertical direction.

The upstream fins 15 are arranged upstream of the downstream fins 17 in the air passage 11 and spaced apart in the vehicle widthwise direction. Support shafts 16 are projected from the opposite end surfaces of each of the upstream fins 15 in the vertical direction and faced outward in the vertical direction. Each upstream fin 15 is supported by the two lateral wall portions 14 with the two support shafts 16. This allows the upstream fin 15 to pivot about the support shafts 16 in the vehicle widthwise direction.

In the air-conditioning register, when the air-conditioning air A1 passes through the air passage 11, the air-conditioning air A1 flows along the upstream fins 15 and the downstream fins 17. Each upstream fin 15 is installed at the vertical ends by the corresponding two support shafts 16. Thus, each upstream fin 15 is allowed to change the inclination with respect to the vehicle widthwise direction by pivoting about the two support shafts 16. Each downstream fin 17 is installed at the widthwise ends by the corresponding two support shafts. Thus, each downstream fin 17 is allowed to change the inclination with respect to the vertical direction by pivoting about the two support shafts. The air-conditioning air A1 flows in the direction corresponding to the inclinations of the upstream fins 15 and the downstream fins 17 and blows out through the outlet port 12.

<Shut-Off Damper 20>

The air-conditioning register includes, in addition to the above-described basic configuration, a flat plate-like shut-off damper 20 arranged upstream of the upstream fins 15 in the retainer 10. The shut-off damper 20 is pivotal about a pair of shafts 21 (see FIGS. 4 and 5) between an open position and a closed position. One of the two shafts 21 is configured by a member independent from the shut-off damper 20 and shown in neither FIG. 4 nor FIG. 5. When at the open position, the shut-off damper 20 is in a state parallel or substantially parallel to the two lateral wall portions 14 in a middle portion between the lateral wall portions 14 (as represented by the solid lines in FIG. 1A). When at the closed position, the shut-off damper 20 is in a state inclined with respect to the two lateral wall portions 14 (as represented by the long dashed double-short dashed lines in FIG. 1A).

The shut-off damper 20 includes a damper body 22 serving as a frame portion and a sealing portion 27.

The damper body 22 is formed of hard plastic such as polypropylene (PP). A major part of the damper body 22 is configured by a flat plate-like base portion 23 having a thickness T1. The base portion 23 is shaped in a laterally elongated rectangular plate-like shape having a dimension in the vehicle widthwise direction that is greater than the dimension of the base portion 23 in the direction perpendicular to the vehicle widthwise direction. To distinguish peripheral portions of the base portion 23 from each other, with reference to FIGS. 4 and 5, peripheral portions facing each other in the vehicle widthwise direction is referred to as vertical peripheral portions 24 and the peripheral portions perpendicular to the vertical peripheral portions 24 are referred to as lateral peripheral portions 25.

As illustrated in FIGS. 1A and 2, each of the lateral peripheral portions 25 of the base portion 23 includes a thin portion 26, which has a thickness T2 smaller than the thickness of the base portion 23 and extends along the lateral peripheral portion 25 in the vehicle widthwise direction. The thin portions 26 are formed integrally with the base portion 23. In the first embodiment, the thickness T1 of the base portion 23 is set to 2.5 mm and the thickness T2 of each thin portion 26 is set to 1.0 mm.

Each of the vertical peripheral portions 24 has a shaft 21. The damper body 22 is supported by the two vertical wall portions 13 with the shafts 21.

The sealing portion 27 is formed of a plastic material softer than the material of the damper body 22, such as thermoplastic elastomer (TPE). TPE is a polymeric material that plasticizes when heated and thus becomes machinable like plastic and exhibits properties of elastomer when at an ordinary temperatures. The hardness of the sealing portion 27 is preferably in the range of 30 to 70 Shore A. With hardness in the aforementioned range, the hardness of the sealing portion 27 is not excessive. The operating load necessary for elastically deforming an increased thickness portion 36, which will be described later, is thus unlikely to increase excessively. Also, the amount of elastic deformation of the increased thickness portion 36 becomes appropriate, thus making it unlikely that a gap will be formed between a distal sealing portion 31 and the corresponding one of the lateral wall portions 14 at the closed position. Also, the softness of the increased thickness portion 36 is not excessive. It is thus unlikely that, at the closed position, the sealing portion 27 will swing due to air pressure generated by the air-conditioning air A1. This maintains desirable sealing performance of the sealing portion 27 with respect to the lateral wall portions 14. The hardness of the sealing portion 27 is more preferably in the range of 40 to 60 Shore A. In the first embodiment, the hardness of the sealing portion 27 is set to 50 Shore A.

The sealing portion 27 is formed integrally with an outer peripheral portion of the damper body 22 to extend at least along the outer peripheral portion. In the first embodiment, the sealing portion 27 is formed substantially along the entire circumference of the outer peripheral portion of the damper body 22.

Figure 5:
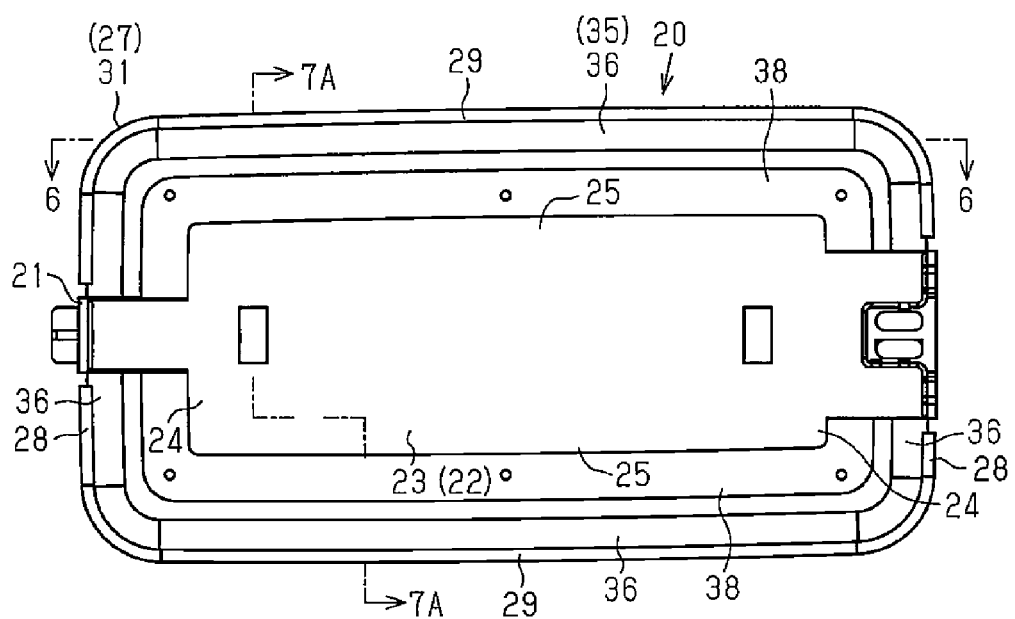
FIG. 5 is a front view showing the shut-off damper of FIG. 1A.

To distinguish the sealing portions 27 from each other, referring to FIGS. 4 and 5, portions facing each other in the vehicle width direction are referred to as vertical sealing portions 28 and portions perpendicular to the vertical sealing portions 28 are referred to as lateral sealing portions 29. The function of the vertical sealing portions 28 is different from the function of the lateral sealing portions 29. The two vertical sealing portions 28 are constantly located close to or held in slight contact with the inner wall surfaces 13a of the corresponding vertical wall portions 13 regardless of the inclination angle of the shut-off damper 20. When the shut-off damper 20 is at the closed position, the two lateral sealing portions 29 are held in contact with the inner wall surfaces 14a of the corresponding lateral wall portions 14.

As illustrated in FIGS. 1B, 4, and 5, the vertical sealing portions 28 and the lateral sealing portions 29 each include the distal sealing portion 31 and a joint portion 35. With reference to FIGS. 3A to 3C and 6, the lateral dimension M1 of the shut-off damper 20 is set to such a value that, regardless of the inclination angle of the shut-off damper 20, the distal sealing portion 31 of each vertical sealing portion 28 is located close to or held in slight contact with the inner wall surface 13a of the corresponding vertical wall portion 13. More specifically, the lateral dimension M1 of the shut-off damper 20 is set to such a value that the gap G1 between the distal sealing portion 31 of each vertical sealing portion 28 and the corresponding inner wall surface 13a is in the range of 0 mm to 0.5 mm. If the gap G1 is in this range, the amount of the air-conditioning air A1 leaking from between each vertical sealing portion 28 and the corresponding vertical wall portion 13 of the shut-off damper 20 is contained in a tolerable range. Further, each vertical sealing portion 28 is unlikely to contact the corresponding vertical wall portion 13. This also makes it unlikely that the operating load for pivoting the shut-off damper 20 will become excessively great. As a result, decrease in durability of the shut-off damper 20 is also restrained.

As illustrated in FIG. 2, the vertical dimension M2 of the shut-off damper 20 is set to such a value that, when the shut-off damper 20 is pivoted to the closed position, the distal sealing portion 31 of each lateral sealing portion 29 is held in contact with the corresponding lateral wall portion 14 with the joint portion 35 of the lateral sealing portion 29 elastically deformed. In other words, the vertical dimension M2 of the shut-off damper 20 is set to such a value that, if the shut-off damper 20 is pivoted to the closed position without flexing the joint portions 35, the lateral sealing portions 29 become overlapped with the corresponding lateral wall portions 14 each by a lap amount L1. The lap amount L1 is preferably in the range of 1.0 mm to 1.5 mm. When the lap amount L1 is in this range, the magnitude of the operating load for pivoting the shut-off damper 20 to the closed position is appropriate. Also, even if the dimensions of the retainer 10 and the shut-off damper 20 are maximum values in possible variations, the lateral sealing portions 29 are allowed to contact the opposing lateral wall portions 14. That is, formation of a gap between each lateral sealing portion 29 and the corresponding lateral wall portion 14 of the shut-off damper 20 will be avoided.

With reference to FIGS. 7A to 7C, each distal sealing portion 31 has a cross section that is configured by a projected curved portion 32 and referred to with reference index CS. When the shut-off damper 20 is located at the closed position, the corresponding distal sealing portions 31 are held in contact with the inner wall surfaces 14a of the lateral wall portions 14 at the curved portions 32 (see FIG. 8). In the first embodiment, each of the curved portions 32 is curved by a single curvature. The cross section CS is thus shaped similar to a circle.

Each of the joint portions 35 is a portion for joining the corresponding one of the distal sealing portions 31 and the damper body 22 together and has flexibility. At least a part of the joint portion 35 of each lateral sealing portion 29 in the longitudinal direction of the joint portion 35 has an increased thickness portion 36 having a thickness gradually increasing toward the damper body 22. The maximum thickness of each of the increased thickness portions 36 is set to a value equal or close to the thickness T1 (FIG. 1A) of the base portion 23. In the first embodiment, each increased thickness portion 36 extends over the entire length in the longitudinal direction of the joint portion 35 of the corresponding lateral sealing portion 29. Also, as illustrated in FIGS. 4 and 5, the increased thickness portions 36 are provided also in the joint portions 35 of the vertical sealing portions 28.

As shown in FIGS. 7B and 7C, inclined surfaces 37 on opposite sides in the thickness direction of each increased thickness portion 36 (the left-and-right direction as viewed in FIGS. 7B and 7C) are each inclined by a constant angle α with respect to an imaginary plane P1 extending perpendicular to the thickness direction of the damper body 22. The angle α is preferably in the range of 5° to 25°. When the angle α is in this range, it is unlikely that, with the shut-off damper 20 located at the open position, the flow direction of the air-conditioning air A1 will be rapidly changed by the increased thickness portions 36. Generation of turbulence is thus unlikely to happen. Also, rigidity of each increased thickness portion 36 is ensured to make it unlikely that the increased thickness portion 36 will be elastically deformed to an excessive extent when the shut-off damper 20 is at the closed position. The angle α is more preferably in the range of 10° to 20°. In the first embodiment, the angle α is set to 11°.

Each joint portion 35 has a constant thickness portion 38 between the damper body 22 and the increased thickness portion 36. The thickness of each of the constant thickness portions 38 is set to a value equal or close to the thickness T1 (FIG. 1A) of the base portion 23. The lateral sealing portions 29 cover the thin portions 26 of the damper body 22 at the corresponding constant thickness portions 38.

The shut-off damper 20, which has the above-described configuration, is formed with the sealing portion 27 provided integrally with the damper body 22 through two-color molding (double molding). The two-color molding is a plastic molding method in which a plurality of types of metal molds are prepared, a basic one of the molds is rotated, and a multi-stage plastic injection procedure is performed such that two types of plastics are injected and molded in an overlapped manner through a single cycle of molding.

Unlike Japanese Laid-Open Patent Publication No. 2012-214177, the shut-off damper 20 is configured without a sealing member formed independently from the damper body 22 using soft material.

Operation of the first embodiment, which is configured in the above-described manner, will hereafter be described separately for a closed state and an open state of the air passage 11.

<When the Air Passage 11 is Closed by the Shut-Off Damper 20>

When at the closed position represented by the long dashed double-short dashed lines in FIG. 1A, the shut-off damper 20 is in a state inclined with respect to the lateral wall portions 14. As illustrated in FIG. 8, the increased thickness portion 36 of each lateral sealing portion 29 is in a state elastically deformed and flexed. That is, the distal sealing portion 31 of each lateral sealing portion 29 is held in contact with the inner wall surface 14a of the corresponding lateral wall portion 14 at the projected curved portion 32 configuring the cross section CS. By elastic restoring force produced by the increased thickness portion 36 of each lateral sealing portion 29, the distal sealing portion 31 of the lateral sealing portion 29 is pressed against the inner wall surface 14a at the curved portion 32. The increased thickness portion 36 of each lateral sealing portion 29 has a thickness increasing toward the damper body 22 to exhibit increased rigidity. The elastic restoring force produced by the increased thickness portion 36 of each lateral sealing portion 29 is thus greater than the elastic restoring force produced in the form in which the thickness of each joint portion 35 is smaller than the thickness of each increased thickness portion 36 and is constant (the form described in Japanese Laid-Open Patent Publication No. 2004-74945). The distal sealing portions 31 of the lateral sealing portions 29 are thus more firmly pressed against the inner wall surfaces 14a. Such firm pressing increases the amount of elastic deformation of each distal sealing portion 31. The distal sealing portion 31 is thus held in contact with the corresponding inner wall surface 14a in a larger area. As a result, tight contact performance of the distal sealing portion 31 of each lateral sealing portion 29 with respect to the corresponding inner wall surface 14a is improved.

In the first embodiment, each of the increased thickness portions 36 extends over the entire length in the longitudinal direction of the joint portion 35 of the corresponding lateral sealing portion 29. This improves the tight contact performance of each lateral sealing portion 29 with respect to the corresponding inner wall surface 14a. The effect of restraining leakage of the air-conditioning air A1 is ensured in a larger zone in the longitudinal direction of the lateral sealing portion 29.

<When the Air Passage 11 is Opened by the Shut-Off Damper 20>

When at the open position represented by the solid lines in FIG. 1A, the shut-off damper 20 is located in a middle portion between the two lateral wall portions 14 and extended parallel or substantially parallel to the lateral wall portions 14. The air passage 11 is thus open widely.

When proceeding in the air passage 11, the air-conditioning air A1 flows along the shut-off damper 20. As shown in FIG. 1B, the air-conditioning air A1 flows along the corresponding distal sealing portion 31 first in the sealing portion 27. The cross section CS of each distal sealing portion 31 is configured by the curved portion 32, which is projected and curved by a single curvature. Therefore, by flowing along the curved portion 32, the air-conditioning air A1 is allowed to change its flow direction gradually and smoothly. Unlike the form having a corner portion in the cross section CS (the form described in Japanese Laid-Open Patent Publication No. 2012-214177), the air-conditioning air A1 is unlikely to become separate to a great extent and thus hamper its flow.

After passing the distal sealing portion 31, the air-conditioning air A1 flows along the corresponding joint portion 35. The part of the joint portion 35 configured by the increased thickness portion 36 includes the inclined surfaces 37, which are arranged on the opposite sides in the thickness direction of the increased thickness portion 36. The inclined surfaces 37 are inclined by the constant angle α with respect to the imaginary plane P1, which extends perpendicular to the thickness direction of the damper body 22. The thickness of each increased thickness portion 36 increases toward the damper body 22.

As a result, unlike the case in which the thickness of each joint portion 35 is smaller than the thickness of each increased thickness portion 36 and is constant (the form described in Japanese Laid-Open Patent Publication No. 2004-74945), zones generating turbulence in the air-conditioning air A1 are unlikely to be created on the opposite sides in the thickness direction of the increased thickness portion 36. Flowing along the increased thickness portion 36 allows the air-conditioning air A1 to restrain turbulence and thus flow downstream efficiently while changing the flow direction to directions along the inclined surfaces 37 of the increased thickness portion 36, which are inclined with respect to the imaginary planes P1.

The resistance to the air-conditioning air A1 when proceeding along the increased thickness portion 36 is decreased compared to a case in which turbulence is generated. This correspondingly decreases the pressure loss of the air-conditioning air A1 when proceeding along the increased thickness portion 36.

In the first embodiment, each increased thickness portion 36 extends over the entire length in the longitudinal direction of the joint portion 35 of the corresponding lateral sealing portion 29. This restrains turbulence and ensures that the effect of decreasing the resistance to airflow and pressure loss is obtained in a larger zone in the longitudinal direction of the joint portion 35.

The above described first embodiment achieves the following advantages.

(1) The sealing portion 27 of the shut-off damper 20 includes the distal sealing portions 31 and the joint portions 35. Each distal sealing portion 31 is held in contact with the inner wall surface 14a of the corresponding lateral wall portion 14 of the retainer 10 at the closed position. Each joint portion 35 is flexible and joins the corresponding distal sealing portion 31 and the damper body 22 together. Each distal sealing portion 31 has the cross section CS configured by the projected curved portion 32 and causes the curved portion 32 to contact the corresponding inner wall surface 14a. At least a part of each joint portion 35 joined to the distal sealing portion 31, which is caused to contact the inner wall surface 14a, which is the joint portion 35 of each lateral sealing portion 29, in the longitudinal direction of the joint portion 35 includes the increased thickness portion 36, the thickness of which increases toward the damper body 22 (FIGS. 1A and 1B).

Therefore, when the shut-off damper 20 is at the closed position (FIG. 2), a larger area of each distal sealing portion 31 is firmly pressed against the inner wall surface 14a of the corresponding lateral wall portion 14. This improves the tight contact performance of the sealing portion 27 with respect to the inner wall surfaces 14a and decreases the amount of the air-conditioning air A1 leaking from between the inner wall surfaces 14a and the shut-off damper 20.

When the shut-off damper 20 is located at the open position (FIG. 1B), turbulence is restrained, and the resistance to airflow and the pressure loss are further decreased compared to the form described in Japanese Laid-Open Patent Publication No. 2004-74945.

(2) The inclined surfaces 37 are formed on the opposite sides in the thickness direction of each increased thickness portion 36. Each of the inclined surfaces 37 is inclined by the constant angle α with respect to the imaginary plane P1 extending perpendicular to the thickness direction of the damper body 22 (FIGS. 7B and 7C).

As a result, when the shut-off damper 20 is at the open position (FIG. 1B), the flow direction of the air-conditioning air A1 is changed to the directions inclined by the angle α with respect to the imaginary planes P1.

(3) The angle α described in (2) is set in the range of 5° to 25° (FIGS. 7B and 7C).

As a result, when the shut-off damper 20 is located at the open position (FIG. 1B), turbulence of the air-conditioning air A1 is unlikely to occur. Also, when the shut-off damper 20 is at the closed position (FIG. 8), excessive elastic deformation of each increased thickness portion 36 is restrained.

(4) Each increased thickness portion 36 of the shut-off damper 20 extends over the entire length in the longitudinal direction of the corresponding joint portion 35 joined to the distal sealing portion 31, which is caused to contact the inner wall surface 14a of the lateral wall portion 14, which is the joint portion 35 of the corresponding lateral sealing portion 29 (FIGS. 4 and 5).

This configuration ensures that the advantages (1) to (3), which are achieved by each distal sealing portion 31 and the corresponding increased thickness portion 36, are obtained in a larger zone of the joint portion 35 of the corresponding lateral sealing portion 29 in the longitudinal direction of the joint portion 35.

(5) Each projected curved portion 32 is curved by a single curvature (FIG. 1B).

As a result, when the shut-off damper 20 is at the open position, the flow direction of the air-conditioning air A1 is changed gradually and smoothly by causing the air-conditioning air A1 to flow along the corresponding curved portions 32. This restrains a rapid change in the flow direction of the air-conditioning air A1.

(6) If the joint portions 35 are not flexed when the shut-off damper 20 is pivoted to the closed position, the sealing portion 27 becomes overlapped with the lateral wall portions 14 by the lap amount L1 of 1.0 mm to 1.5 mm (FIG. 2).

As a result, the magnitude of the operating load for pivoting the shut-off damper 20 to the closed position becomes appropriate. Also, even if the dimensions of the retainer 10 and the shut-off damper 20 are maximum values in the possible variations, the lateral sealing portions 29 are allowed to contact the inner wall surfaces 14a of the opposing lateral wall portions 14.

Second Embodiment

An air-conditioning register for a vehicle according to a second embodiment will hereafter be described with reference to FIGS. 9 to 12.

When the shut-off damper 20 is pivoted from the open position to the closed position, large vortexes may be generated between the distal sealing portions 31 of the lateral sealing portions 29 and the inner wall surfaces 14a of the lateral wall portions 14 immediately before the shut-off damper 20 reaches the closed position, depending on the extent of variation in the dimensions of the retainer 10 and the shut-off damper 20. This may generate wind noise (whistling).

Figure 9:
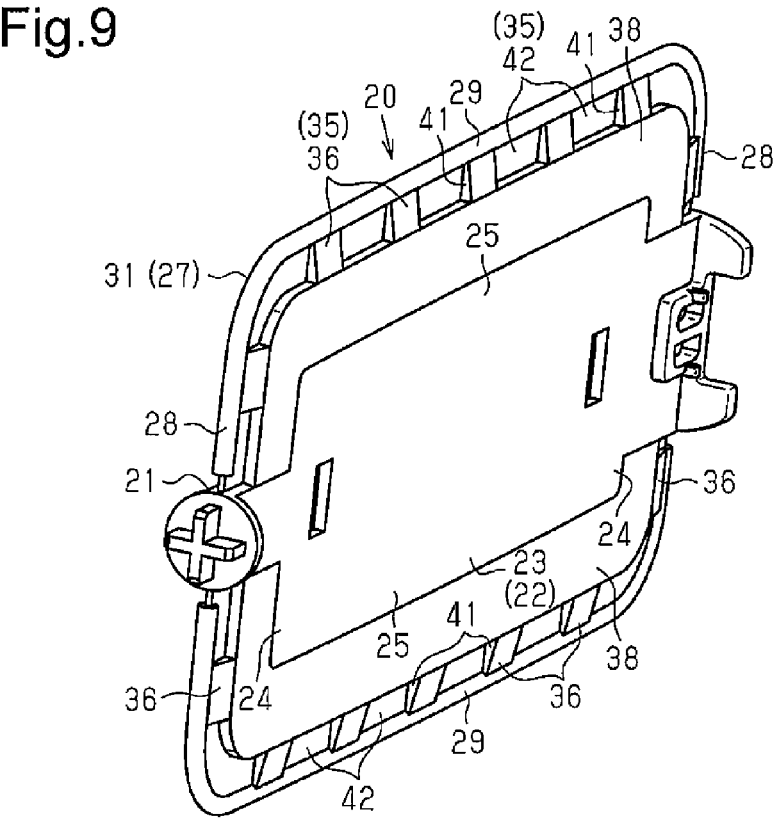
FIG. 9 is a perspective view showing a shut-off damper of an air-conditioning register for a vehicle according to a second embodiment.
Figure 10:
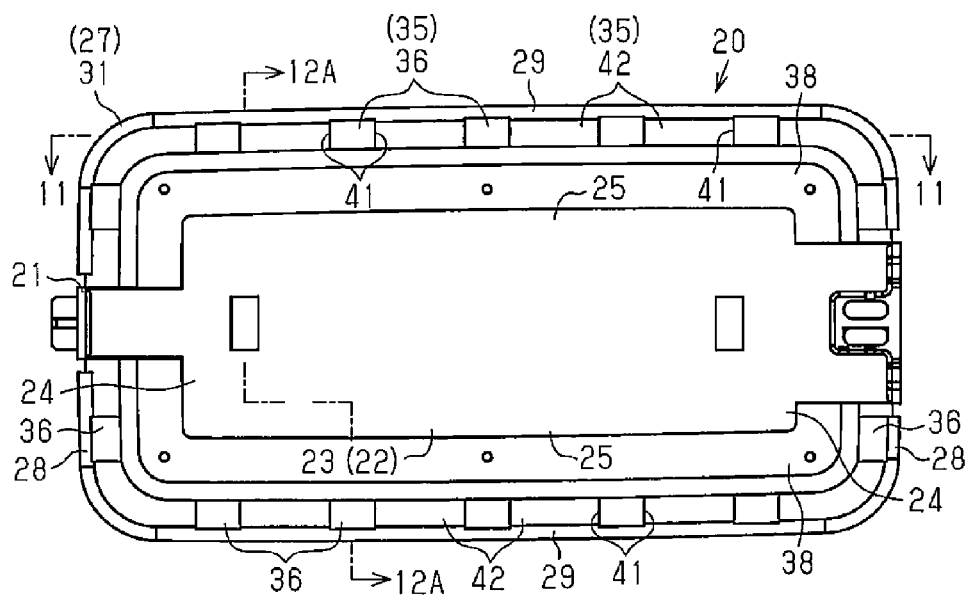
FIG. 10 is a front view showing the shut-off damper shown in FIG. 9.

In the second embodiment, referring to FIGS. 9 and 10, increased thickness portions 36 are provided at multiple positions spaced apart in the longitudinal direction of the joint portion 35 in each joint portion 35 joined to the corresponding distal sealing portion 31, which is caused to contact the inner wall surface 14a of the lateral wall portion 14, which is the joint portion 35 of each lateral sealing portion 29. A step forming portion 42, which has a thickness T3 (see FIG. 11) different from the thickness of each increased thickness portion 36, is arranged between each adjacent pair of the increased thickness portions 36 of each joint portion 35. A step portion 41 is formed between each of the increased thickness portions 36 and the corresponding one of the step forming portions 42.

As illustrated in FIG. 12B, the thickness T3 of each step forming portion 42 is constant unlike the thickness of each increased thickness portion 36 (see FIG. 12C). The thickness T3 of the step forming portion 42 is set to 0.5 mm, which is a value smaller than the minimum thickness of the increased thickness portion 36. The curvatures the curved portion 32 of each distal sealing portion 31 are designed such that the curvature of each part joined to the distal end of any step forming portion 42 is equal to the curvature of each part joined to the distal ends of any increased thickness portion 36. However, the circumferential length of the former parts of the curved portion 32, which corresponds to the distal end of any step forming portion 42, is greater than the circumferential length of the latter part of the curved portion 32, which corresponds to the distal ends of any increased thickness portion 36. The former part of the curved portion 32, which corresponds to the distal end of any step forming portion 42, is closer to a circular shape than the latter part of the curved portion 32, which corresponds to the distal end of any increased thickness portion 36.

With reference to FIG. 11, the dimension L2 of each increased thickness portion 36 in the longitudinal direction of the lateral sealing portion 29 is set to 5 mm. The dimension L3 of each step forming portion 42 is set to 10 mm. Combinations of the increased thickness portions 36 and the step forming portions 42 are formed repeatedly in the longitudinal direction of each lateral sealing portion 29.

Other than these differences, the second embodiment is the same as the first embodiment. Therefore, like or the same reference numerals are given to those components that are like or the same as the corresponding components of the first embodiment and detailed explanations are omitted.

Operation of the air-conditioning register according to the second embodiment, which has the above-described configuration, will now be described.

When the shut-off damper 20 is pivoted from the open position to the closed position, vortexes are generated between the distal sealing portions 31 of the lateral sealing portions 29 and the inner wall surfaces 14a of the lateral wall portions 14 immediately before the shut-off damper 20 reaches the closed position. However, the vortexes, which would grow into large vortexes, are divided into small vortexes by passing the step portions 41, each of which is formed between the corresponding increased thickness portion 36 and the adjacent step forming portion 42. This attenuates high-frequency sound and decreases wind noise (whistling), which is bearable to the occupants of the vehicle.

As the shut-off damper 20 is continuously pivoted toward the closed position, the increased thickness portions 36 and the step forming portions 42 of each lateral sealing portion 29 are elastically deformed and flexed. The distal sealing portion 31 of each lateral sealing portion 29 is thus caused to contact the inner wall surface 14a of the corresponding lateral wall portion 14 at the projected curved portions 32. The elastic restoring force produced by the increased thickness portions 36 and the elastic restoring force produced by the step forming portions 42 press the distal sealing portion 31 against the corresponding inner wall surface 14a. Since the thickness T3 of each step forming portion 42 is smaller than the minimum thickness of each increased thickness portion 36 and is constant, rigidity of the step forming portion 42 is smaller than rigidity of the increased thickness portion 36. The step forming portions 42 are thus elastically deformed more easily than the increased thickness portions 36. The parts of the distal sealing portion 31 of each lateral sealing portion 29 joined to the step forming portions 42 are thus pressed against the inner wall surface 14a of the corresponding lateral wall portion 14 by small pressure compared to the parts of the distal sealing portion 31 joined to the increased thickness portions 36. This decreases the operating load for pivoting the shut-off damper 20 to the closed position compared to the form without a step forming portion 42 in any of the joint portions 35 (the first embodiment).

Thus, the second embodiment achieves the following advantages in addition to the above described advantages (1) to (3), (5), and (6).

(7) The increased thickness portions 36 are provided at multiple positions spaced apart in the longitudinal direction of the joint portion 35 in each joint portion 35 joined to the distal sealing portion 31, which is caused to contact the inner wall surface 14a of the corresponding lateral wall portion 14, which is the joint portion 35 of each lateral sealing portion 29. Also, the step forming portions 42 are each formed between the corresponding adjacent pair of the increased thickness portions 36 (FIGS. 9 and 10).

As a result, when the shut-off damper 20 is pivoted from the open position to the closed position, generation of wind noise (whistling) is restrained immediately before the shut-off damper 20 reaches the closed position, regardless of variation in the dimensions of the retainer 10 and the shut-off damper 20.

(8) The thickness T3 of each step forming portion 42 is set to a value that is smaller than the minimum thickness of each increased thickness portion 36 and is constant (FIGS. 12A to 12C).

This decreases the operating load for pivoting the shut-off damper 20 to the closed position, thus improving operating performance of the shut-off damper 20.

The above illustrated embodiments may be modified as follows.

<Regarding the Distal Sealing Portions 31>

The cross section CS of each distal sealing portion 31 may be configured by a plurality of curved portions 32 having different curvatures. For example, the cross section CS may be configured by two curved portions 32 curved by curvatures different from each other on the opposite sides in the thickness direction of the shut-off damper 20.

Each projected curved portion 32, which configures the cross section CS of the corresponding distal sealing portion 31, may have a curvature varying in the circumferential direction.

For example, the curved portion 32 may be formed in an oval shape.

<Regarding the Joint Portions 35>

Figure 13:
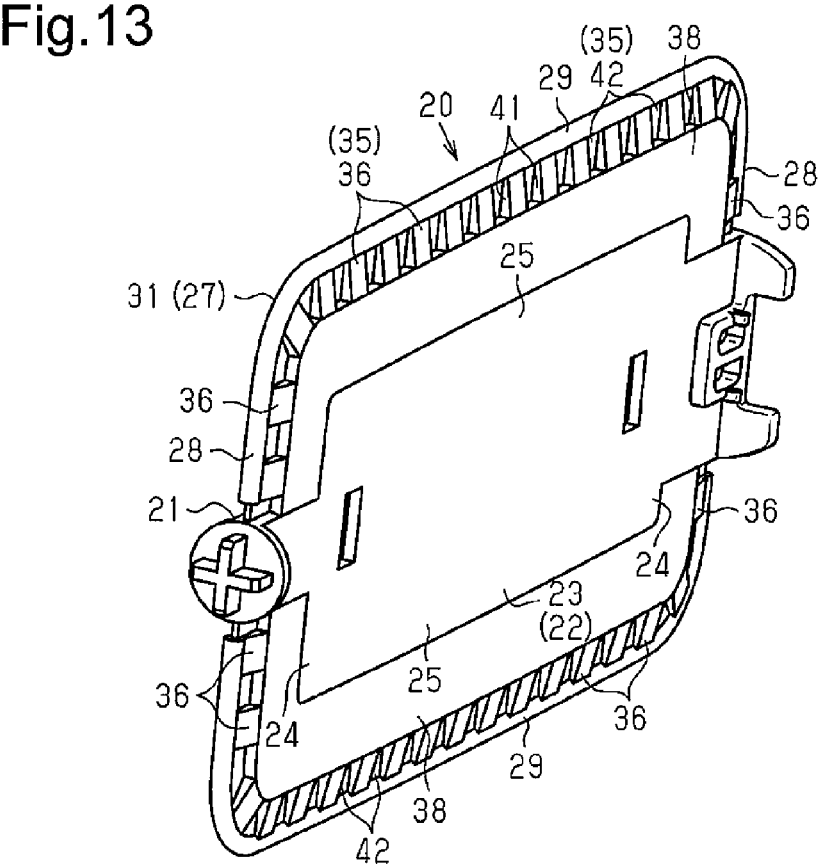
FIG. 13 is a perspective view showing a modification of the shut-off damper shown in FIG. 9.
Figure 14:
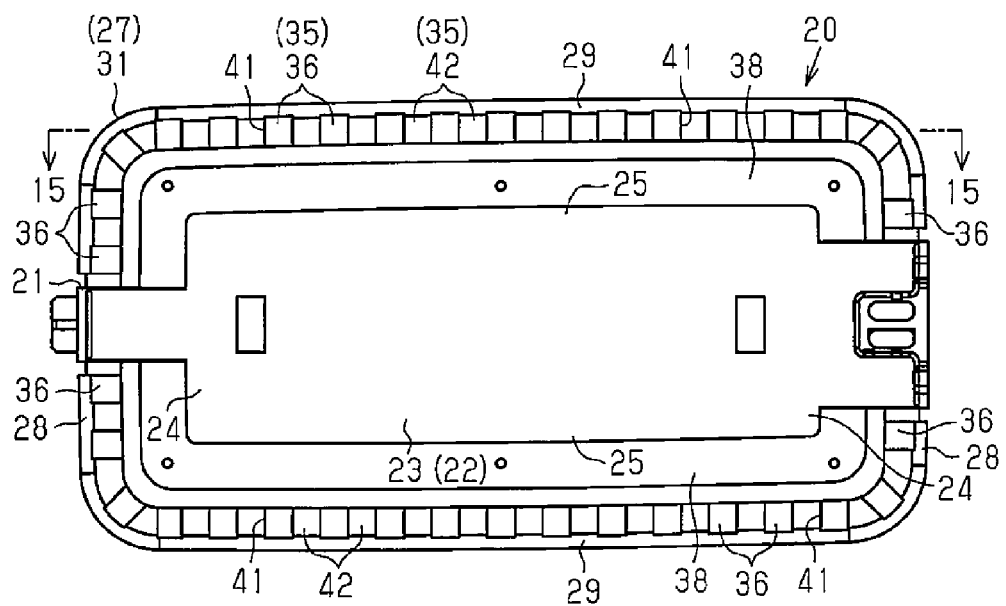
FIG. 14 is a front view showing the shut-off damper shown in FIG. 13.
Figure 15:
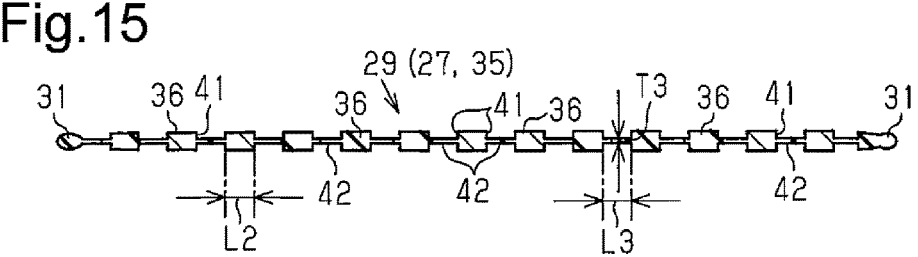
FIG. 15 is a cross-sectional view taken along line 15-15 of FIG. 14.
Figure 16:
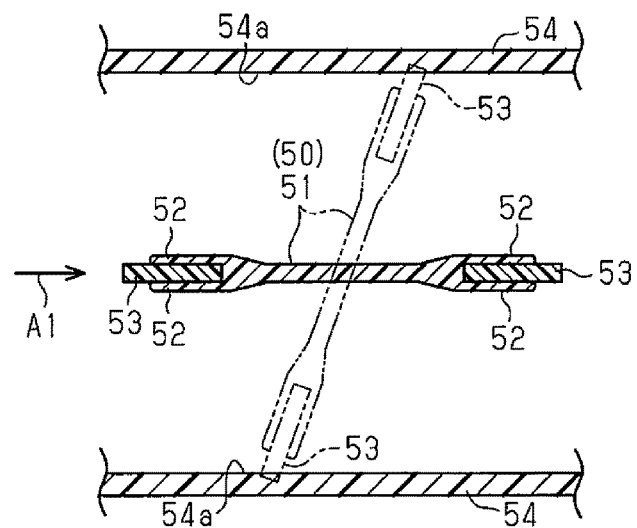
FIG. 16 is a cross-sectional side view of a part of a conventional air-conditioning register, illustrating a shut-off damper and its periphery.
Figure 17:
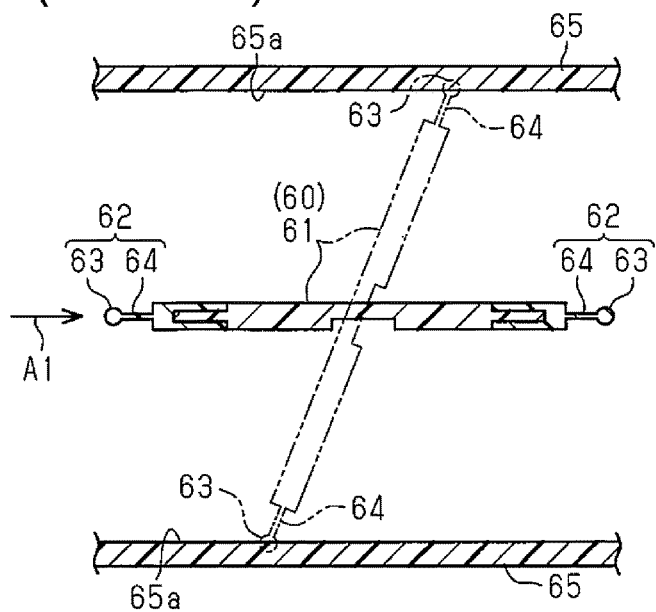
FIG. 17 is a cross-sectional side view of a part of another conventional air-conditioning register different from the air-conditioning register shown in FIG. 16, illustrating a shut-off damper and its periphery.
Figure 18:
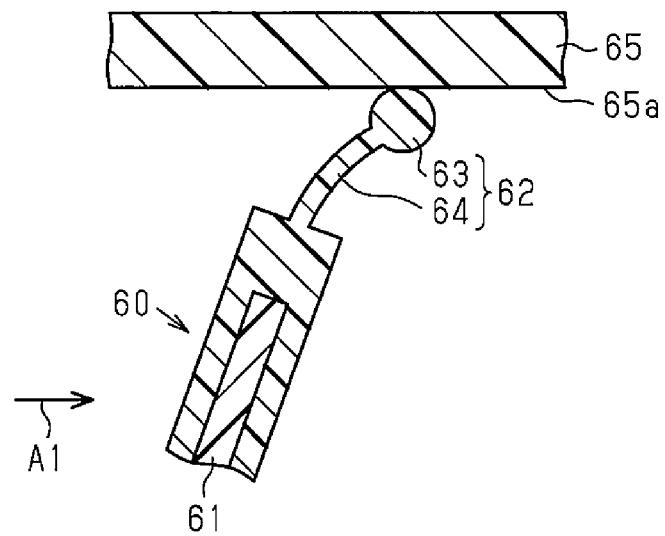
FIG. 18 is a cross-sectional side view of a part of the air-conditioning register shown in FIG. 17, illustrating a state in which, with a shut-off damper at a closed position, a sealing portion is held in contact with an inner wall surface of a retainer.
Figure 19:
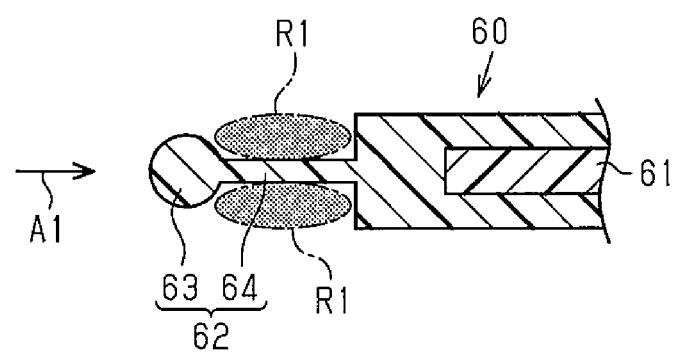
FIG. 19 is a cross-sectional side view showing a part of the air-conditioning register of FIG. 17 with the shut-off damper at an open position, together with zones generating turbulence in air-conditioning air.

The number of combinations of the increased thickness portions 36 and the step forming portions 42, which are formed repeatedly in the longitudinal direction of each lateral sealing portion 29 (the vehicle widthwise direction), may be changed to a number different from the corresponding number of the second embodiment. FIGS. 13 to 15 each illustrate an example in which the number of the combinations is changed to a number greater than the corresponding number of the second embodiment. Specifically, the dimension L2 of each increased thickness portion 36 in the longitudinal direction of the lateral sealing portion 29 (the vehicle widthwise direction) is set to 3 mm. The dimension L3 of each step forming portion 42 is set to 3 mm. In this configuration, the step forming portions 42 occupy each lateral sealing portion 29 by an increased proportion. This improves performance of restraining wind noise (whistling) by dividing vortexes of air-conditioning air A1 into small vortexes immediately before the shut-off damper 20 reaches the closed position.

As long as the condition that "the step portions 41 are formed between the step forming portions 42 and the corresponding increased thickness portions 36" is satisfied, the thickness T3 of each step forming portion 42 may be changed to a thickness different from the corresponding thicknesses of the second embodiment and the modification illustrated in FIGS. 13 to 15. For example, the thickness T3 may be set to a value that is constant and middle between the minimum value and the maximum value of the thickness of each increased thickness portion 36. Alternatively, the thickness T3 may be set to a value equal to or greater than the maximum value of the increased thickness portion 36.

As long as the above-described condition is satisfied, the thickness T3 of each step forming portion 42 does not necessarily have to be constant.

If each joint portion 35 is configured by repeated combinations of the increased thickness portions 36 and the step forming portions 42, or, in other words, if the joint portion 35 is configured by the multiple increased thickness portions 36 and the multiple step forming portions 42, the dimension L2 of each increased thickness portion 36 may be set such that any adjacent pair of the increased thickness portions 36 have either equal or unequal dimensions L2. Similarly, the dimension L3 of each step forming portion 42 may be set such that any adjacent pair of the step forming portions 42 have either equal or unequal dimensions L3.

The constant thickness portion 38 of each joint portion 35 may be omitted.

The inclined surfaces 37 on the opposite sides in the thickness direction of each increased thickness portion 36 may have different angles α with respect to the corresponding imaginary planes P1.

Although the inclined surfaces 37 on the opposite sides in the thickness direction of each increased thickness portion 36 may each be formed as a flat surface as in the illustrated embodiments, each of the inclined surfaces 37 may be formed as a curved surface as long as the condition that the thickness of each increased thickness portion 36 increases toward the damper body 22 is satisfied.

<Regarding Fins>

At least one of the set of the upstream fins 15 and the set of the downstream fins 17 may be omitted. Also, other fins may be provided in addition to the upstream fins 15 and the downstream fins 17.

<Regarding Applicability>

The above-described air-conditioning registers are each usable as an air-conditioning register incorporated in a portion different from the instrument panel of the passenger compartment, such as a dashboard.

The above-described air-conditioning registers are applicable not only to a vehicle but also to a variety of purposes as long as the air-conditioning registers change the direction of the air-conditioning air supplied from an air conditioner and delivered into the passenger compartment through an outlet port and have a shut-off damper for selectively opening and closing an air passage.

OTHER MODIFICATION

The above-described air-conditioning registers may each be used as an air-conditioning register having a lower profile compared to the illustrated embodiments. In this case, the resistance to airflow and the pressure loss are particularly effectively reduced. Specifically, the air-conditioning register having a low-profile has a flattened outlet port 12 compared to a non low-profile air-conditioning register. This increases the extent of influence on the actual opening area of the outlet port 12 by the shut-off damper 20.

The invention claimed is:

1. An air-conditioning register comprising a tubular retainer having an air passage for air-conditioning air and a shut-off damper arranged in the retainer, wherein
the shut-off damper has a damper body serving as a frame portion and a sealing portion softer than the damper body, wherein the shut-off damper is pivoted between an open position for opening the air passage and a closed position for closing the air passage,
the sealing portion extends along a damper body outer peripheral edge,
the sealing portion includes a distal sealing portion caused to contact an inner wall surface of the retainer at the closed position and includes a joint portion joining the distal sealing portion and the damper body together, wherein the joint portion is flexible,
the distal sealing portion has a cross section configured by a projected curved portion and contacts the inner wall surface of the retainer at the curved portion,
at least a part of the joint portion in a radial direction of the shutoff damper has an increased thickness portion having a thickness increasing toward the damper body,
the increased thickness portion is one of a plurality of increased thickness portions arranged at a plurality of positions in the joint portion that are spaced apart along an outer peripheral edge of a constant thickness portion of the sealing portion, the constant thickness portion being connected to the damper body outer peripheral edge, and
a step forming portion is arranged between each adjacent pair of the increased thickness portions, wherein the step forming portion has a thickness different from the thickness of the increased thickness portions and forms a step portion between the step forming portion and each of the corresponding increased thickness portions.

2. The air-conditioning register according to claim 1, wherein the damper body has a plate-like shape, and surfaces on opposite sides in a thickness direction of the increased thickness portion are each inclined by a constant angle with respect to an imaginary plane extending perpendicular to the thickness direction of the damper body.

3. The air-conditioning register according to claim 2, wherein the angle is set in a range of 5° to 25°.

4. The air-conditioning register according to claim 1, wherein the curved portion is curved by a single curvature.

* * * * *